Figure 3:
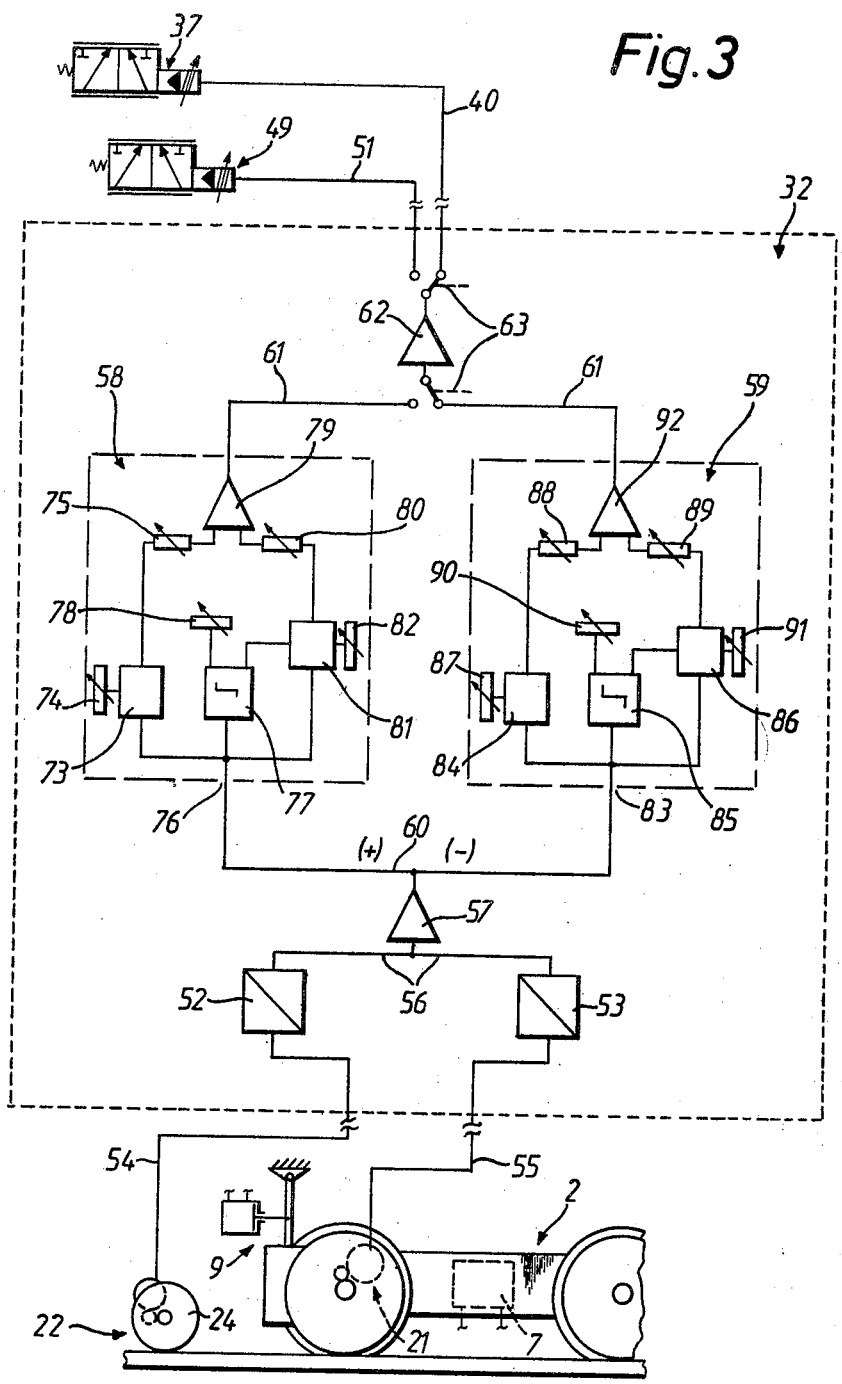

United States Patent [19]

Theurer et al.

[11] Patent Number: 4,457,237
[45] Date of Patent: Jul. 3, 1984

[54] ELECTRONIC ANTI-SPIN AND ANTI-SLIP CONTROL FOR DRIVE AND BRAKE OF AN INTERMITTENTLY ADVANCING TRACK WORKING MACHINE

[75] Inventors: Josef Theurer, Vienna; Mihir Ganguly, Linz; Gërnotböck, Gschach; Wilhelm Praschl, Linz, all of Austria

[73] Assignee: Franz Plasser Bahnbaumaschinen-Industrie-Gesellschaft mbH, Vienna, Austria

[21] Appl. No.: 295,491

[22] Filed: Aug. 24, 1981

[30] Foreign Application Priority Data

Oct. 8, 1980 [AT] Austria ................... 5003/80

[51] Int. Cl.³ .............................. B60T 8/10
[52] U.S. Cl. ............................ 105/61; 104/7 B; 104/12; 180/197; 303/105; 318/52; 105/73
[58] Field of Search ................. 104/12, 7 R, 7 B; 291/2; 180/197; 303/3, 93, 94, 105, 96; 105/61, 105/73; 318/52; 361/238; 242

[56] References Cited

U.S. PATENT DOCUMENTS

| | | | |
|---|---|---|---|
| 2,321,059 | 6/1943 | Anderson | 105/73 |
| 2,735,090 | 2/1956 | Maenpaa | 291/2 |
| 3,400,776 | 9/1968 | Smith | 180/197 |
| 3,482,887 | 12/1969 | Sheppard | 303/3 |
| 3,610,362 | 10/1971 | Toyama et al. | 180/197 |
| 3,762,333 | 10/1973 | Theurer et al. | 104/12 |

FOREIGN PATENT DOCUMENTS 1049412  1/1959  Fed. Rep. of Germany.
1906513  10/1969  Fed. Rep. of Germany.

Primary Examiner—Robert B. Reeves
Assistant Examiner—David F. Hubbuch
Attorney, Agent, or Firm—Kurt Kelman

[57] ABSTRACT

A mobile track working machine arranged for intermittent advancement along the track comprises a drive, a brake for braking the driven wheels at respective working sites between the intermittent advancement of the machine, a speedometer generating a signal indicating the speed of advancement and a device generating a signal indicating the peripheral speed of the driven wheels. A fully electronically operated control arrangement for avoiding spinning of the driven wheels at the start of the advancement of the machine and locking of the wheels at braking includes a circuit having an input receiving the signals and an output connected to the drive and brake for constantly maintaining the nominal desired value of the drive and brake moments and for reducing the traction and brake forces in dependence on any drive or brake slippage.

4 Claims, 3 Drawing Figures

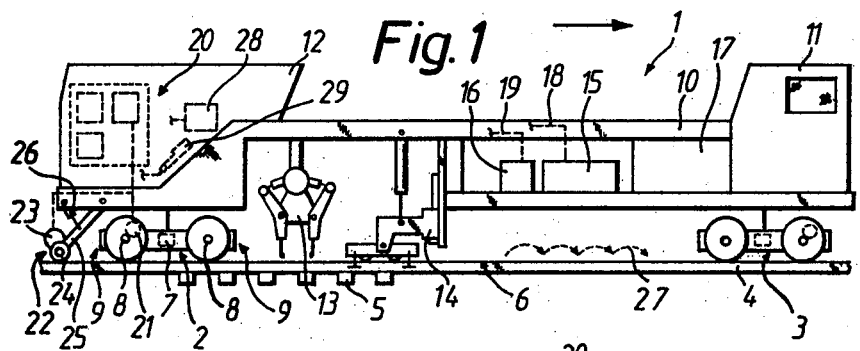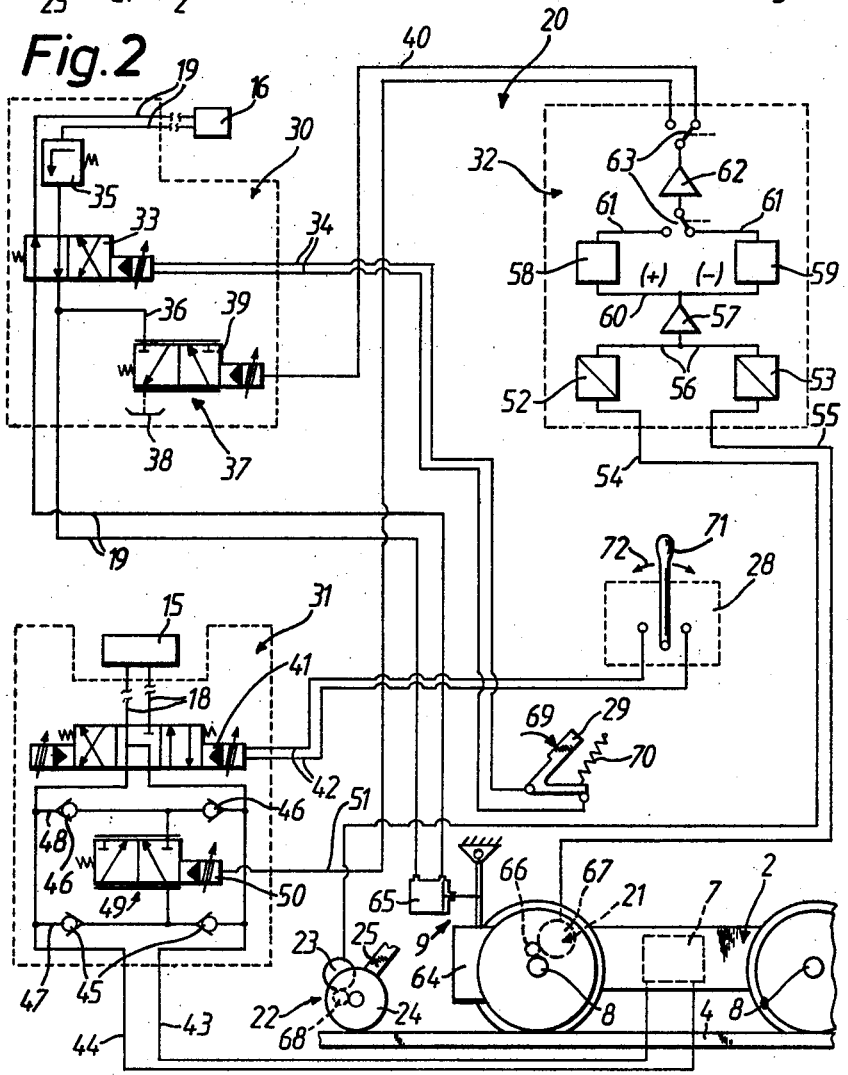

ELECTRONIC ANTI-SPIN AND ANTI-SLIP CONTROL FOR DRIVE AND BRAKE OF AN INTERMITTENTLY ADVANCING TRACK WORKING MACHINE

The present invention relates to a mobile track working machine, particularly a track tamper operating with an intermittent advancement of the machine from tie to tie, but generally to machines arranged for intermittent advancement along the track consisting of two rails fastened to ties and comprising undercarriages with wheels engaging the rails, drive means connected to at least some of the wheels for driving the wheels and brake means for braking the driven wheels at respective working sites, i.e. ties, between the intermittent advancement of the machine.

A specific problem arising in the operation of such machines which advance intermittently is the cyclic repetition of starting and braking of these relatively heavy machines at each working site. This is aggravated by the high drive moment that must be imparted to the wheels if the machine is to work efficiently. After a brief acceleration, braking must be initiated to stop the machine at the next working site which may be no farther away than about 50 to 60 centimeters, i.e. the next track tie. This requires very efficient braking, for which purpose such track working machines have special brake means. When the track rails are wet, covered with oil or rusty, the wheels tend to lock during braking so that they slide along the rails and the driven wheels tend to spin at the start of the advancement. Particularly on inclines, the driving and braking conditions vary greatly as does the friction between rails and driven wheels. This may cause slippage of the driven wheels at the start and at braking, i.e. the wheels spin at the start and lock at braking. For example, if the working cycle of a track tamper takes 5 seconds, the machine must be started and stopped 700 times per hour. With such a high number of starts and stops, wheel spinning and locking will not only seriously reduce the efficiency of the machine operation but, additionally, the wheels and the rails will be worn in a very disadvantageous manner. Furthermore, changes in the brake path will make it difficult to center the operating tools properly at the working sites.

German Pat. No. 1,049,412, published Jan. 29, 1959, discloses a track maintenance machine, such as a ballast cleaning machine, comprising two independent gripping elements respectively associated with each track rail to obtain a uniform advancement of the machine along the track. The gripping elements are alternately clamped to the respective rail and their spacing from the machine in the direction of track elongation may be adjusted by operation of a hydraulic jack. This reduces the dependence of the advancement of the machine on the prevailing friction conditions between wheels and rails and slippage therebetween is avoided. This arrangement is limited in practice because the gripping elements cannot be suitably engaged with the rails at all locations, for instance at rail joints where fishplates or welding seams may be in the way. Furthermore, this arrangement is cumbersome, particularly where large and relatively heavy machines are involved. It is not adapted for use with machines whose intermittent advancements are rather short, such as track tampers. In fact, the machine has not been used commercially.

U.S. Pat. No. 3,762,333, dated Oct. 2, 1973, discloses a mobile track working machine of the first described type wherein the disadvantages of the different friction and braking conditions encountered during the intermittent advancement of the machine from tie to tie are avoided by providing an automatic control for the advancement of the machine so as to assure the centering of the operating tools at each working site. This machine comprises means for measuring the speed of advancement of the machine, such as an odometer wheel rolling on a track rail, the advancement speed measuring means including means for generating a signal indicating the speed of advancement, and a sensor indicating the actual positions of the ties. The signal is transmitted to a control element constituted by a pulsor, the signals indicating each distance traveled by the machine being transmitted to a control instrument. The signal generating means is connected to a signal counter of the control instrument, the counter having two pre-settable counter sets. When the tamper advances to the next tie to be tamped, the pulsor resets the signal generating means to zero when a rail fastening element is sensed. Upon further advancement of the machine and when the number of signal pulses has reached a number preset on the counter, braking is automatically started. After a second number of signal pulses set on the counter has been reached, the tamper head is lowered. If a wheel slippage causes an increase in the braking path, the operator correspondingly re-sets the counter. This arrangement enables the operating tools to be centered accurately even if the crib widths differ or if the wheel slippage varies and, therefore, the length of the braking path has to be changed. However, this automatic control of the machine advancement is rather expensive and is, therefore, of practical use only on high-efficiency machines. Such machines with hydraulic drives and hydraulic brakes controlled in the indicated manner have been used with great success but the non-uniform wear of the driven wheels and the track rails caused by the wheel slippage cannot be fully avoided with this arrangement.

German Patent Application No. 1,906,513, published Oct. 30, 1969, discloses an arrangement for avoiding the spinning of wheels in the relatively long starting path of such continuously advancing tractors as locomotives. The arrangement has exclusively mechanical and electrical components including means for measuring the continuous advancement speed of the locomotive and any difference between the peripheral speed of the driven wheel and the driving speed, which constitutes the speed of slippage, i.e. the speed when there is slippage, as well as means for triggering protective measures against spinning of the wheels in response to any detected slippage. Furthermore, a slippage limiting instrument comprised of a resistance chain or so-called dead-zone member and a limiting counter is connected to a rectifier control instrument and a control valve of the brake system. If the wheels spin at the start of the locomotive, any measured difference of the actual driving speed determined by an odometer is compared with the magnitude of the dead-zone member. The resultant difference between the measured values is transmitted to the rectifier control instrument for changing the drive moment of the motor. The dead-zone member is so arranged that no measuring signals are transmitted within a range determined by an auxiliary voltage. This auxiliary voltage is determined by the limiting counter in dependence on the driving speed, the motor current and a parameters selectable by the engineer. A delay of the slippage protection produced by this arrangement, which is dependent on the condition of the rails and the driving speed, is effected to obtain a higher adhesion coefficient in the range of a smaller slippage. This specific arrangement is useful solely with continuously advancing rail tractors for pulling a train of railroad cars and having extended starting paths. The arrangement avoids spinning of driven wheels but cannot help in preventing locking of the wheels during braking. It is not useful in the operation of intermittently advancing track working machines.

It is the primary object of this invention to improve a mobile track working machine designed for intermittent advancement along the track from working site to working site, for instance from tie to tie, which avoids the various disadvantages of prior art machines encountered in the intermittent advancement of the machine under various rail conditions and which assures an accurate stepwise advancement of the machine under all operating conditions.

The above and other objects are accomplished according to the invention in a mobile track working machine of the first-indicated type by providing means for measuring the speed of advancement of the machine, the advancement speed measuring means including means for generating a signal indicating the speed of advancement and means for measuring the peripheral speed of the driven wheels, the peripheral speed measuring means including means for generating a signal indicating the peripheral speed. A fully electronically operated control arrangement for avoiding spinning of the driven wheels at the start of the advancement of the machine and locking of the wheel at braking includes a circuit having an input receiving the signals indicating the speed of advancement of the machine and the peripheral speed of the driven wheels, and an output connected to the drive means and the brake means for constantly maintaining the nominal desired value of the drive and brake moments and for reducing the traction and brake forces in dependence on any drive or brake slippage.

A mobile track working machine equipped with this very simple arrangement will always automatically provide the strongest possible friction between the driven wheels and the track rails and essentialy exclude wheel slippage at the start of the drive as well as during braking, regardless of the surface conditions of the rails. In such a track working machine, wheel spinning and locking will be dependably prevented practically automatically and, in this manner, the wheels and the track rails will be protected against undue and/or irregular wear. During track rehabilitation work, rail conditions change frequently and such changes bring about problems in connection with the relatively rapidly changing friction coefficients encountered along the intermittent advancement of the machine. The electronic control arrangement solves this problem in a particularly simple and efficient manner. Because a slippage value signal generated by the electrically operated control arrangement is transmitted directly to the drive and brake controls, the very short start and brake path in the intermittent advancement of the machine from tie to tie is traversed without wheel slippage. The constant control of the drive moment or brake pressure, which is proportional to the slippage value transmitted by the control arrangement makes it possible at all times to make use of maximally best friction for each prevailing rail condition and thus to achieve the highest efficiency in the operation of the machine. Any irregular wear of the driven wheels and particularly of the rails is completely avoided despite ever changing rail conditions during extraordinarily high numbers of starting and braking operations as the machine intermittently advances during the track work. The slippage value is constantly re-determined by comparing the measured speed of advancement of the machine with the measured peripheral speed of the driven wheels during each working cycle, at each start as well as at each braking, and the constant and continuous comparison of these values makes a maximally favorable setting for the next intermittent advancement possible so that substantially no slippage is encountered at any start or braking.

The above and other objects, advantages and features of the invention will become more apparent from the following detailed description of a now preferred embodiment thereof, taken in conjunction with the generally schematic drawing wherein FIG. 1 shows a side elevational view of the track tamper advancing intermittently from tie to tie for tamping ballast under successive ties;

FIG. 2 is a schematic circuit diagram of the drive and brake control arrangement for the track tamper of FIG. 1; and FIG. 3 is another circuit diagram showing a circuit of the control arrangement in detail.

Referring now to the drawing and first to FIG. 1, there is shown a mobile track working machine illustrated by track tamping, leveling and lining machine 1 arranged for intermittent advancement in the direction indicated by an arrow along track 6 consisting of two rails 4 fastened to ties 5. The machine comprises undercarriages 2 and 3 with wheels engaging rails 4. Drive means is connected to at least some of the wheels for driving the wheels, the illustrated embodiment having rear undercarriage 2 comprised of two pairs of wheels mounted on axles 8 which are driven by hydraulic drive means 7 constituted by an oil motor. Hydraulic brake means 9 are arranged to be applied to the driven wheels for braking the driven wheels at respective working sites between the intermittent advancement of machine 1.

The machine is generally conventional and is shown to comprise frame 10 at whose respective ends are mounted operator's cabs 11 and 12. A respective tamper head 13 is mounted on machine frame 10 between cabs 11 and 12 in association with each rail 4 and the machine frame also carries track lifting and lining unit 14, the operation and structure of these devices being well known. Control panel 28 is mounted in cab 12 to enable an operator to control the intermittent advancement of machine 1 and brake pedal 29 in cab 12 enables the operator to stop the machine at each working site.

Machine frame 10 also carries power plant 15, 16, 17 including oil sumps 15 and 16 respectively supplying hydraulic fluid to drive means 7 and brake means 9 through pressure lines 18 and 19, the oil sumps being connected to Diesel motor 17. Fully electronically controlled control arrangement 20 is built into hydraulic fluid lines 18, 19 for controlling the drive and brake means so as to avoid spinning of the driven wheels at the start of the advancement of the machine and locking of the wheels at braking.

Machine 1 also comprises means 22 for measuring the speed of advancement of the machine, measuring means 22 including means 23 for generating a signal indicating the speed of advancement. In addition, the machine comprises means 21 for measuring the peripheral speed of the wheels driven by axles 8, peripheral speed measuring means 21 including means 67 for generating a signal indicating the peripheral speed of the driven wheels. Speed measuring means 21 and 22 also are connected to control arrangement 20. The illustrated advancement speed measuring means or speedometer 22 comprises rubber-covered measuring roller 24 running on rail 4 and driving signal generator 23 by means of gear 68 transmitting the rotation of roller 24 to the signal generator. Suspension rod 25 links measuring roller 24 to the machine frame and jack 26 links the suspension rod to the frame to enable the measuring roller to be lifted off the rail. The flangeless measuring roller remains in its lowered position in engagement with the rail when the machine advances intermittently from working site to working site, as shown by arrows 27 in FIG. 1. To be certain that the measuring roller remains in contact with the rail in track curves, it is arranged close to undercarriage 2.

Electronic control arrangement 20 is shown in detail in FIG. 2 and comprises circuit 32 having input 52 receiving the signals from generator 23 indicating the speed of advancement of the machine and output 62 connected to drive means 7 and brake means 9 for constantly maintaining the nominal desired value of the drive and brake moments and for reducing the traction and brake forces in dependence on any drive or brake slippage.

In the illustrated embodiment, circuit 32 has input signal receiving elements 52 and 53 respectively connected to advancement speed and peripheral speed indicating signal generators 23 and 67, and control elements 58 and 59 connected to the input signal receiving elements whereby the control elements are responsive to the input signals. The drive means includes hydraulically operated drive control 31 and the brake means includes hydraulically operated brake control 30. Output 62 of circuit 32 is connected to drive and brake controls 31, 30, control elements 58, 59 controlling output 62 and the drive and brake controls thereby being responsive to the input signals.

The fully electronically operated control arrangement in combination with hydraulically operated drive and brake controls assures a particularly speedy adaptation of the controls to any prevailing track condition without delay while at the same time retaining the well known advantages of hydraulic operation of track working machines, which is known to assure dependable, fast and trouble-free operating characteristics. These advantages are further enhanced because the arrangement provides a constant comparison of the actual drive speed with the peripheral speed of the driven wheels by means of instant emissions of signal pulses and analog signals.

This comparison in circuit 32 provides a slippage value signal corresponding to the difference between the input signals at output 62. Drive control 31 includes electro-hydraulic proportional valve 49 and brake control 30 includes electro-hydraulic proportional valve 39. Output 62 is connected to valve 39 by signal transmission line 40 and to valve 49 by signal transmission line 51. This arrangement assures an immediate response even if the differences between the input signals are small, thus further increasing the responsiveness of the system and its accurate adaptation to all operating conditions.

Referring to FIG. 2, brake control 30 is shown to comprise two-way valve 33 controlling brake means 9 and connected by pressure line 19 to oil sump 16. Brake pedal 29 operates as a switch in control circuit 34 for operating two-way valve 33. Pressure limit valve 35 is mounted in pressure line 19 between oil sump 16 and two-way valve 33 to limit the hydraulic pressure to a desired level. Branch line 36 connects control element 37 to pressure line 19 and the control element has outlet 38 connected to sump 16. This control element is constituted by electro-hydraulic proportional valve 39 which is opened in direct proportion to the magnitude of the output signal transmitted from circuit 32 through line 40 to valve 39. The hydraulic fluid pressure applied to brake means 9 through pressure lines 19 is controlled by bleeding a controlled amount of the pressure through branch line 36 by operation of proportional valve 39.

Drive control 31 is shown to comprise three-way valve 41 arranged in pressure lines 18 connected to oil sump 15. Control lever 71 mounted on panel 28 is actuatable for operating drive control valve 41 for starting the advancement of the machine, the three-way valve being positioned for forward and reverse drive, respectively, by moving the control lever in the directions indicated by arrow 72, the intermediate position of control lever 71 causing the valve to close so that the drive is stopped. The three-way valve is connected to drive means 7 by pressure line 43 and return line 44, the pressure and return lines being interconnected by connecting lines 47 and 48, check valves 45 and 46 being respectively arranged in connecting lines 47, 48. While check valves 45 in line 47 interrupt the connection between pressure and return lines 43, 44, check valves 46 in line 48 do not block the connection between the pressure and return lines in both directions. Control element 49 interconnects connecting lines 47, 48 between the check valves. The control element is an electro-hydraulic proportional valve 50 and comprises a servo-motor for steplessly converting steplessly changing electrical signals into hydraulic energy by changing the cross section of the hydraulic fluid flow. The electrical signals are transmitted from the output of circuit 32 by signal transmission line 51.

In the illustrated embodiment, the control elements of circuit 32 are frequency/voltage converters 52, 53. Signal transmission lines 54 and 55 respectively transmit the signals indicating the speed of advancement of the machine from generator 23 to element 52 and the signals indicating the peripheral speed of the driven wheels from generator 67 to element 53. Circuit 32 includes difference member 57 connected to the outputs of frequency/voltage converters 52, 53 by signal transmission line 56. The difference member is arranged to emit a positive signal indicating drive slippage and a negative signal indicating brake slippage, signal transmission line 60 connecting the output of difference member 57 to control elements 58, 59. This arrangement assures a practically delay-free operation of the control elements so that any slippage of the driven wheel, which is determined by the measured difference between the speed of the driven wheel and the speed measuring roller, has been found in practical operations to be held to a rotational angle of no more than about 1° to 2°. If each undercarriage is independently controlled, any wheel slippage is dependably avoided even in the range of short distances involving different rail conditions.

The output of circuit 32 comprises signal amplifier 62, signal transmission lines 61 connecting the input of the amplifier to control elements 58, 59 and the output of the amplifier being connected to signal transmission lines 40 and 51 for transmitting the output signals of circuit 32 to brake control 30 and drive control 31. Switches 63 are arranged respectively between transmission lines 61 and the input of amplifier 62, and the output of the amplifier and transmission lines 40 and 51.

For a better understanding of control arrangement 20, FIG. 2 shows rear undercarriage 2, with drive means 7, means 22 for measuring the speed of advancement of the machine, and means 21 for measuring the peripheral speed of the driven wheels, only schematically. Means 21 comprises drive axle 8 for the driven wheels and gear 66 transmitting the rotation of the drive axle to generator 67. Means 22 comprises flangeless roller 24 whose rotation is transmitted by gear 68 to generator 23. The signals emitted by generators 23 and 67 respectively correspond to the rotational speeds of measuring roll 24 and drive axle 8.

Brake means 9 comprises brake shoe 64 applied against drive axle 8 by double-acting brake cylinder 65. Brake pedal 29 operates like a switch actuating two-way valve 33 for operating the brake means when the pedal is depressed in the direction indicated by arrow 69 and the brake pedal is returned to its rest position by compression spring 70. The operation of drive means 7 by control lever 71 has been described hereinabove.

The above-described control arrangement operates in the following manner:

To start the machine advancement and braking cycle during the intermittent advancement of machine 1 in the manner indicated by arrows 27, the operator in cab 12 respectively moves drive control lever 71 connected to drive control 31 and brake pedal 29 connected to brake control 30. This respectively causes three-way valve 41 and two-way valve 33 to be moved into their operating position to deliver hydraulic fluid to drive means 7 and to brake means 9 when the control lever or brake pedal are moved so that drive axle 8 is rotated, on the one hand, and brake cylinder 65 applies brake shoe 64 to the driven wheel, on the other hand. When the control lever is moved into the intermediate position shown in FIG. 2, the drive means remains in the rest position. After the operator takes his foot off the brake pedal, compression spring 70 instantly returns the pedal into its rest position wherein the control circuit established by lines 42 is interrupted and double-acting brake cylinder 65 moves brake shoe 64 away from the driven wheels.

If the rail conditions are substantially perfect, the rotational speeds of freely-rotating measuring roller 24 engaging rail 4 for measuring the speed of advancement of the machine and of drive axles 8 of the driven wheels are equal. Therefore, generators 23 and 67 operated by the rotation of the measuring roller and drive axle, respectively, emit the same number of signal pulses corresponding to the measured speeds. A constant comparison is made in the control arrangement, to which the signals are transmitted, between the actual speed of machine advancement and the corresponding peripheral speed of the driven wheels, the generators being designed for substantially instant transmission of the signal pulses. (Obviously, it would be possible to use analog signals instead of the signal pulses.) As soon as the driven wheels pass over wet, oily or rusted track rails, wheels to which the brake has been applied tend to lock and glide and driven wheels tend to spin at the start of the advancement. This is automatically prevented by the control arrangement of the present invention and the wheels and rails are thereby protected against excessive and/or irregular wear. When signal generators 23 and 67 emit different numbers of signal pulses, there is a relative movement between machine 1 and rails 4, i.e. the driven wheels spin at the start of the advancement and, therefore, have a greater rotational speed than measuring roller 24 which frictionally engages rail 4, while the speed of advancement of the machine is greater than the rotational speed of the locked driven wheels at braking.

The digital input signals transmitted from signal generators 23 and 67 through signal transmission lines 54 and 55 to the input of circuit 32 are converted into analog voltages in frequency/voltage converters 52 and 53. Line 56 transmits the two signals to difference member 57 where the difference between the two input voltages is formed and balanced so that the difference becomes zero when the desired number of rotations corresponds to the actual number of rotations. This indicates no wheel slippage. Depending on whether the number of rotations measured by roller 24 is greater (spinning of the wheels) or smaller (locking or gliding of the wheels), the output of difference member 57 will produce a positive or negative differential voltage respectively indicating drive slippage and brake slippage. Thus, a slippage value signal is emitted from circuit 32 when there is a slippage between wheel and rail, the magnitude and the type of signal depending on that of the slippage: the positive signal indicates a drive slippage or spinning of the wheel and the negative signal indicates a brake slippage or locking of the wheel. Electronic units 58 and 59 are connected to difference member 57 by line 60 for respectively receiving the positive and negative signals and for dynamically influencing the positive and negative signals in a manner to be described hereinafter in connection with FIG. 3. The position of switches 63 respectively connecting the input of output amplifier 62 to signal transmission lines 61 coming from units 58 and 59, and the amplifier output to signal transmission lines 40 and 51 connected to the brake and drive controls depends on the position of brake pedal 29 and drive control lever 71, respectively. The position of lever 71 and pedal 29 shown in FIG. 2 illustrates braking of the machine. The slippage value signal is amplified in output amplifier 62 and, in the illustrated position of switch 63 is transmitted by line 40 to brake control 30.

Since brake pedal 29 has been depressed in the direction of arrow 69, the circuit constituted by lines 34 is closed to actuate two-way valve 33 against the bias of a spring coil into the illustrated position. This permits hydraulic fluid from sump 16 to flow through pressure line 19 to brake cylinder 65 which presses brake shoe 64, which is pivotally mounted on machine frame 10, against the driven wheel. Electro-hydraulic proportional valve 39 controls the hydraulic fluid flow proportionally to the magnitude of the slippage value signal received from circuit 32, the cross section of the initially closed bleeding line 36 being increased proportionally to the opening of valve 39, which is controlled by the signal transmitted to the valve from circuit 32 through line 40. The hydraulic fluid flowing out of control valve 39 at 38 is returned to oil sump 16. The opening of proportional valve 39 causes a pressure reduction in pressure line 19 so that the pressure on brake shoe 64 is correspondingly reduced, thus avoid locking of the braked wheel. As soon as the operator lifts his foot off brake pedal 29, compression spring 70 biases the pedal to interrupt the control circuit 34 controlling valve 33. A return spring then causes the valve to be reversed, causing the hydraulic fluid in lines 19 to flow in the opposite direction, i.e. from the brake cylinder back to the oil sump, so that brake shoe 64 is removed from the driven wheel.

When the operator wishes to initiate the start of the next advancement of the machine, he pivots drive control lever 71 so as to close control circuit 42 energizing the solenoid of three-way valve 41 whereby the valve body is moved into a respective one of its end positions determining in which direction the machine is advanced along the track. This opens the flow of hydraulic fluid from oil sump 15 through a respective pressure line 18 to pressure line 43 connected to drive means 7 and thence to return line 44, the drive means being turned in one or the other direction, depending on the selected end position of valve 41. The hydraulic pressure in the hydraulic drive circuit is so selected that no spinning of the driven wheel occurs when the wheel and the rail are in good condition. If the traction force exceeds that required by the prevailing driving conditions, a drive slippage or spinning of the wheel will occur. In this case, difference member 57 will generate a differential voltage proportional to the drive slippage in a manner analogous to that described hereinabove in connection with the brake slippage signal, and the dynamically influenced signal will be transmitted from electronic unit 58 to control element 49 of drive control 31. This control element is also a proportional electro-hydraulic valve and is so actuated by the signal emitted from circuit 32 and transmitted to valve 50 through signal transmission line 51 that the rotary moment of drive axles 8 is reduced to the desired magnitude. This reduction is effected by an opening of the valve in proportion to the signal so that the cross section of the lines interconnecting lines 47, 48 is increased proportionally. With this shorted connection of the pressure line 43 through check valves 46 and control valve 49 to check valves 45 and pressure line 44, the pressure is reduced so as to reduce the drive moment of drive means 7. The set desired nominal values for the drive and brake moments remain constant while these automatic controls operate.

In the specific embodiment of circuit 32 illustrated in FIG. 3, electronic control units 58 and 59 are connected to difference member 57. The positive signal indicating drive slippage is transmitted by line 60 to control unit 58. This unit comprises proportional signal amplifier 73 and the amplifier may be set by amplifying regulator 74 so as to amplify the signal strongly enough so that a strong output signal for the actuation of drive control valve 49 will be produced even at the slightest slippage (before recognizable marks are produced on the rails). The portion of this control voltage may be controlled by regulating element 75. Control unit 58 also comprises integral amplifier 77 connected in parallel to proportional amplifier 73 and input line 76 transmits the positive differential voltage simultaneously to the integral amplifier. The switching point may be adjusted by switching element 78 so that integral amplifier 77 may be switched off when the signals are very small. Summing amplifier 79 of control unit 58 is connected to the amplifiers and if the set switch point is exceeded, integral amplifier 77 is connected for a brief instant (in the range of about 20 milliseconds) to affect the output of the summing amplifier, depending on the portion of the voltage adjusted by regulating element 80. Integral regulator 81 with associated timer 82 is connected to the output of integral amplifier 77 and connects the same to summing amplifier 79.

Electronic control unit 58 dynamically influences the slippage value signal constituted by the differential voltage emitted by difference member 57 in the following manner:

As soon as a differential voltage signal appears at input 76 of electronic unit 58, the high amplification factor of proportional amplifier 73 causes summing amplifier 79 to be saturated, i.e. control valve 49 of drive control 31 is fully actuated. The magnitude of this full actuation, which produces a corresponding reduction of the drive moment, may be freely selected. For example, a 20% reduction of the drive moment required for normal rail conditions obtained by the full actuation of control valve 49 will prevent spinning of the driven wheels when the rail conditions are poor. By reducing the drive moment, the rotational speed of drive axle 8 is reduced to that of measuring roller 24. Since the signals now emitted by generators 23 and 67 are equal, no slippage value signal is applied to input 76 and proportional amplifier 73 is without effect. Since the proportional part of the signal causes full actuation of control valve 49, the positive summing of the signal part coming from the integral amplifier can have no influence. The output signal from summing amplifier 73 is amplified in output amplifier 62 for control of valve 49 so that the rotational speeds are equalized and the input difference is returned to zero. However, the control signal coming from integral regulator 81 first remains fully stored and can only be reduced to zero in the form of a set time slope (in the range of about 500 milliseconds). This time slope is transmitted to drive control valve 49 and enables machine 1 to be accelerated smoothly. If the driven wheels spin again, the above-described sequence of events is repeated, with a corresponding control of drive control valve 49. The range of the time slope may be conformed to various parameters, such as the desired efficiency of the machine, the rail conditions, etc.

As shown in FIG. 3, electronic control unit 59 has input 83 connected to difference member 57 for receiving the negative control signal therefrom and comprises proportional amplifier 84, integral amplifier 85, integral regulators 88, 89, switching element 90, timer 91 and summing amplifier 92, all constructed and operating substantially in the same manner as described hereinabove in connection with unit 58. The negative differential voltage activates electronic control unit 59 in the same manner as the positive signal activates unit 58, thus dynamically influencing the negative signal which controls control valve 37 of brake control 30. However, elements 87, 88, 89, 90 and 91 are pre-set to take into account the braking, instead of the driving, conditions. Thus, the time slope is set, for example, only within the range of about 50 to about 100 milliseconds to enable the described control to be performed in shorter intervals when the wheels are locked at the time of braking. This increases the effectiveness of the brakes to its maximum.

With these two electronic control units in circuit 32, the controls may be fine-tuned to the specific conditions occurring respectively during driving and braking, making it possible to avoid jerking advancements and fully coordinating the drive and slippage value signals. By associating a respective control arrangement with each undercarriage, no wheel spinning or locking will occur at any undercarriage. Obviously, the undercarriage may be of any desired type, including single-axle undercarriages and swivel trucks.

It will be obvious to those skilled in the art that the dynamic influence on the slippage value signal may be effected in dependence on various parameters with various regulators and combinations thereof. For instance, electronic control units 58 and 59 may comprise a difference amplifier in addition to the proportional and integral amplifiers.

What is claimed is:

1. A mobile track working machine arranged for intermittent advancement along the track consisting of two rails fastened to ties and comprising undercarriages with wheels engaging the rails, drive means connected to at least some of the wheels for driving the wheels, brake means for braking the driven wheels at respective working sites between the intermittent advancement of the machine, the drive means and the brake means each including an electro-hydraulic proportional valve respectively controlling the drive and brake means, means for measuring the speed of advancement of the machine, the advancement speed measuring means including means for generating a signal indicating the speed of advancement, means for measuring the peripheral speed of the driven wheels, the peripheral speed measuring means including means for generating a signal indicating the peripheral speed, and a fully electronically operated control arrangement for avoiding spinning of the driven wheels at the start of the advancement of the machine and locking of the wheels at braking, the control arrangement including an electronic circuit having electronic input signal receiving elements respectively connected to the advancement speed and peripheral speed indicating signal generating means and receiving the signals indicating the speed of advancement of the machine and the peripheral speed of the driven wheels, an electronic difference member connected to the input signal receiving elements and arranged to emit a positive signal indicating drive slippage and a negative signal indicating brake slippage, electronic control units connected to the difference member for respectively receiving the positive and negative signals and for dynamically influencing the positive and negative signals, and an electronic output signal element receiving the signals from the electronic control units and transmitting a slippage value output signal corresponding to the difference between the input signals to the valves controlling drive means and the brake means, the control valves being responsive ot the output signals for constantly maintaining the nominal desired value of the drive and brake moments and for reducing the traction and brake forces in dependence on any drive or brake slippage.

2. The track working machine of claim 1, wherein each electronic control unit comprises a proportional amplifier and an integral amplifier connected in parallel to the proportional amplifier, a summing amplifier connected to the outputs of the proportional and integral amplifiers, and a switching element and an integral regulator associated with the integral amplifier.

3. The track working machine of claim 2, wherein integral amplifier of the electronic control unit receiving the negative signal has a switching time which is shorter than the switching time of the integral amplifier of the electronic control unit receiving the positive signal.

4. The track working machine of claim 1, further comprising a control lever actuatable for operating the drive control for starting the advance of the machine, a signal storage device for storing the negative signals to which the brake control responds, and switching means connecting the output of the signals storage device with the drive control after the control lever has been actuated to start the advancement of the machine.

* * * * *

UNITED STATES PATENT AND TRADEMARK OFFICE
CERTIFICATE OF CORRECTION

PATENT NO. : 4,457,237
DATED : JULY 3, 1984
INVENTOR(S) : THEURER ET AL

It is certified that error appears in the above—identified patent and that said Letters Patent is hereby corrected as shown below:

Cover page, item [75], third inventor's name and address should read --Gernot Böck, Aschach--.

Signed and Sealed this

Fourth Day of June 1985

[SEAL]

Attest:

DONALD J. QUIGG

Attesting Officer     Acting Commissioner of Patents and Trademarks